June 10, 1930.  E. B. CARTWRIGHT  1,763,130
GRAVE MARKER AND FLOWER STAND
Filed Dec. 23, 1927
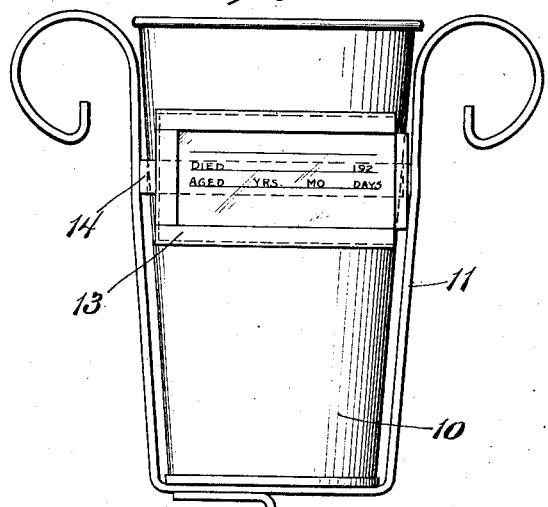
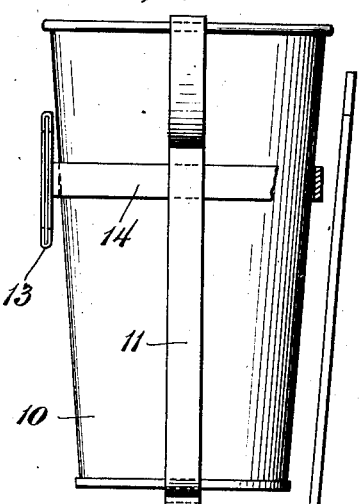
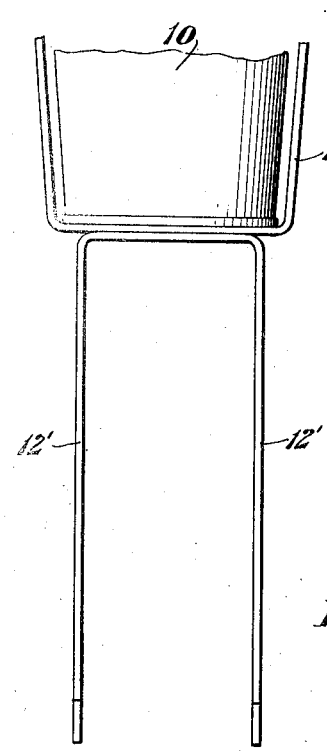
INVENTOR
E. B. Cartwright
BY
ATTORNEYS Patented June 10, 1930

1,763,130

UNITED STATES PATENT OFFICE

EDNEY B. CARTWRIGHT, OF CHATTANOOGA, TENNESSEE

GRAVE MARKER AND FLOWER STAND

Application filed December 23, 1927. Serial No. 242,271.

This invention relates to flower holders and aims, among other objects, to provide an improved frame having provision for an identification card and for carrying a flower pot or can.

In the accompanying drawing:

Fig. 1 is a side elevation of a grave marker embodying the invention.

Fig. 2 is an elevation taken at right angles to Fig. 1, the prong being shown bent ready for crating or packing; and Fig. 3 is a fragmentary elevation of a marker of the same general type as that shown in Fig. 1, but having a pair of prongs.

Referring particularly to the drawing and to the embodiment of the invention shown in Figs. 1 and 2, there is shown a flower pot or can 10 carried in a frame 11 to which is secured a stake or prong 12 adapted to be forced into the ground at a grave. The frame is also shown as having provision for holding a card in the form of a holder 13 secured to the side of a frame hoop 14.

Herein, the pot frame 11 comprises a piece of strap iron bent U-shaped and providing adequate space between the arms to receive the pot which may be of any convenient shape. The upper ends of the arms are shown as being bent outwardly and downwardly to present loops to afford means for gripping the frame and to enable an undertaker or attendant to push the stake or prong 12 into the ground.

Instead of depending upon the resiliency of the arms of the frame 11 to grip and hold the pot or can, the hoop 14 holds the pot and is secured to the arms, near their upper ends, by spot welding or the like. This hoop not only serves to strengthen the frame but, also, embraces the flower pot or can near the top so that it cannot be tilted over or dislodged very easily.

Again referring to Figs. 1 and 2, the lower end of the U-shaped frame is substantially straight and the stake or prong 12 is shown as having its upper end bent at right angles and spot welded to the under side. The stake is also conveniently made of a flat steel or metal bar and is preferably twisted through a quarter turn just below the pot frame to add rigidity to that portion of the stake which will remain above the ground.

The identification card holder 13 is preferably made of sheet metal and is shown as being secured to the hoop 14 also by spot welding. The card may be protected from the weather by a transparent waterproof cover or envelope in which it is inserted before it is slid into the holder.

In Fig. 2, the stake or prong 12 is shown as being bent upwardly ready to be crated so that the shipping space required will be considerably reduced. This stake can easily be straightened when the marker is unpacked ready for use.

In Fig. 3, there is shown a florist's stand which is intended to be stuck in the grave mound and, consequently, does not need to have an identification card holder. Moreover, the stake 12′ in this instance is shown as being inverted U-shaped having two pointed legs much shorter than the stake 12 in Fig. 1. These produce a very rigid stake. They are also secured to the pot or can frame by spot welding.

From the foregoing description, it will be observed that these improved frames may be made very economically of bars of standard strap metal all of the same width and the manufacture involves only a series of simple cutting, bending and welding operations. Moreover, the ornamental appearance of the frames is very attractive.

Obviously the present invention is not restricted to the particular embodiment thereof herein shown and described. Moreover, it is not indispensable that all the features of the invention be used conjointly, since they may be employed advantageously in various combinations and subcombinations.

What is claimed is:

1. A device of the character described comprising, in combination, a substantially U-shaped frame composed of a single piece of strap metal and adapted to hold a flower pot; a hoop secured to the arms of the frame near the top thereof to embrace the pot; and a reversely bent metal stake secured to the lower end of the frame, adapted to be straightened and stuck in the ground.

2. A device of the character described comprising, in combination, a substantially U-shaped frame made of a single piece of strap metal and adapted to hold a flower pot; a hoop secured to the arms of the frame near the top thereof to embrace the pot; an identification card holder on the hoop; and a bendable, pointed metal stake projecting downwardly from the frame.

3. A device of the character described comprising, in combination, a pot frame made of a single piece of strap metal bent U-shaped; a hoop also of strap metal welded to the arms of the frame; and a sharpened stake of strap metal welded to the lower end of the frame, said stake adapted to be bent for crating or shipping purposes.

In testimony, that I claim the foregoing as my own, I have hereto affixed my signature.

E. B. CARTWRIGHT.